(12) United States Patent
Arai et al.

(10) Patent No.: US 6,175,680 B1
(45) Date of Patent: *Jan. 16, 2001

(54) DISPERSION SHIFTED OPTICAL FIBER

(75) Inventors: Shinichi Arai; Noritsugu Enomoto; Youichi Akasaka, all of Ichihara; Tamotsu Kamiya, Funabashi, all of (JP)

(73) Assignee: The Furukawa Electric Co. Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/044,298

(22) Filed: Mar. 19, 1998

(30) Foreign Application Priority Data

Mar. 18, 1997 (JP) .................................... 9-064381

(51) Int. Cl.[7] ................. G02B 6/18; G02B 6/22
(52) U.S. Cl. .................. 385/127; 126/141; 126/142; 126/144
(58) Field of Search .................. 385/123–127, 385/141–145

(56) References Cited

U.S. PATENT DOCUMENTS 4,822,399    4/1989    Kanamori et al. .................. 65/398

FOREIGN PATENT DOCUMENTS

| 63-217311 | 9/1988 | (JP) . |
|---|---|---|
| 64-24040 | 1/1989 | (JP) . |
| 64-24041 | 1/1989 | (JP) . |
| 5-155639 | 6/1993 | (JP) . |
| 9-218318 | 8/1997 | (JP) . |

*Primary Examiner*—John D. Lee
*Assistant Examiner*—Juliana Kang
(74) *Attorney, Agent, or Firm*—Lacasse & Associates

(57) ABSTRACT

The present invention relates to a dispersion shifted optical fiber having zero dispersion at a wavelength band of 1.5 $\mu$m, which suppresses an increase of transmission loss and an increase of polarization mode dispersion when carrying out fiber drawing. An optical fiber according the invention is provided with the first core (refractive index $n_1$.), the second core (refractive index $n_2$), the first clad (refractive index $n_3$) and second clad (refractive index $n_4$) in this order from the center to outside, wherein the abovementioned refractive indexes are in a relationship of $n_1 > n_4 > n_2 > n_3$, Ge which is at a ratio of 0.4 to 1.0% for the value of relative refractive index difference with respect to the second clad is doped on the first core, which is at a ratio of 0.1 to 0.5% for the value of relative refractive index difference with respect to the second clad is doped on the second core as in the above, and the second clad is $SiO_2$, which has a thickness from 1 $\mu$m or more to 40 $\mu$m or less.

2 Claims, 3 Drawing Sheets

DISPERSION SHIFTED OPTICAL FIBER

FIELD OF THE INVENTION

The present invention relates to an optical fiber for long-haul transmissions, and in particular relates to a dispersion shifted optical fiber, in which optical signals having a wavelength band of 1.5 μm are used, suitable for long-haul and high bit rate transmissions.

BACKGROUND OF THE INVENTION

It is well known that $SiO_2$-based single mode optical fibers having zero dispersion at a wavelength of 1.3 μm have a remarkably large chromatic dispersion of 15 ps/km·nm or more at a wavelength band of 1.5 μm, and are thus not suitable for high bit rate and long-haul optical transmissions at a wavelength of 1.5 μm.

As a means of overcoming this limitation, dispersion shifted optical fiber, in which a zero dispersion wavelength is shifted to 1.5 μm band having a dual-shaped core profile shown in FIG. 5, has been proposed as an optical fiber which enables high bit rate and long-haul optical transmissions.

OBJECT AND SUMMARY OF THE INVENTION

Usually, in a dispersion shifted optical fiber having a dual-shaped core (DSC) profile like this, a great deal of Ge is doped on the first core 11 at the center region of the fibre, and the cladding 13 is caused to have a large relative refractive index difference of 0.8 to 1.0%, wherein zero dispersion wavelength is shifted to a 1.5 μm band.

It is typical for a great deal of Ge (germanium) to be doped on the first core 11, a lesser amount of Ge to doped on the second core 12 than is doped on the first core 11, and a pure silica clad is provided. However, in such dispersion shifted optical fiber, optical scattering may occur resulting from a great deal of doped $GeO_2$. Furthermore, the optical scattering is liable to cause an increase of transmission loss.

That is, a DSC type dispersion shifted optical fiber, in which a great deal of Ge is doped on the core, has a tendency of increasing the transmission loss.

Therefore, a DSC type dispersion shifted optical fiber is proposed, wherein F (fluorine), which has a comparatively small influence giving a transmission loss to the second core 12 and is able to lower the refractive index so that the relative refractive index difference can be increased even though Ge is doped on the first core 11, and a great deal of F (fluorine) is doped on the clad 13 through the second core 12.

However, in a dispersion shifted optical fiber of this type, the hardest second core 12 is under tension due to the amount of a dopant when carrying out fiber drawing, and this tension will likely increase the transmission loss.

That is, when carrying out fiber drawing, the first core 11 and clad 13 remain soft although the portion of the second core 12, at which the amount of dopant is small, is in a hard state. Therefore, the first core 11 and clad 13, which were soft, will be solidified after the second core 12 is solidified. Thus, a time lag occurs in the stage of solidification of the respective portions.

Due to minute sways which are produced in an optical fiber from a state where the optical fiber is still soft to a state where the same is solidified during fiber drawing, and changes of temperature distribution on the section of the optical fiber resulting from disorder of gas flows around the optical fiber when the same is solidified, unequal distortion may remain in the sectional direction on the second core 12 which has large tension. per sectional area. The distortion remaining in the second core 12 will cause an increase of polarization mode dispersion (PMD).

In order to solve the abovementioned problem, it is therefore an object of the invention to provide a dispersion shifted optical fiber which is able to suppress an increase of transmission loss generated when drawing fibers is carried out, and to suppress an increase of PMD, and has zero dispersion in a wavelength band of 1.5 μm.

The present invention is provided with the following means in order to solve the abovementioned shortcomings and problems.

An optical fiber according the invention is provided with the first core (refractive index $n_1$), the second core (refractive index $n_2$), the first clad (refractive index $n_3$) and the second clad (refractive index $n_4$) in the order from the center to outside, wherein the abovementioned refractive indexes are in a relationship of $n_1 > n_4 > n_2 > n_3$, Ge which is at a ratio of 0.4 to 1.0% for the value of relative refractive index difference with respect to the second clad is doped on the first core, F which is at a ratio of 0.1 to 0.5% for the value of relative refractive index difference with respect to the second clad is doped on the second core, and the second clad is $SiO_2$, which has a thickness from 1 μm or more to 40 μm or less.

Since an optical fiber according to the invention is such that the amount of doping of $GeO_2$ at the center of the first core is made less than ever, the optical scattering resulting from $GeO_2$ is lessened to cause an increase in transmission.

Furthermore, since the second clad is constructed of pure $SiO_2$ glass although F is doped on the second core and the first clad, the hardest second clad is able to sustain a majority of tension when fiber drawing is carried out, wherein an increase of PMD can be prevented since the second core will not receive any substantial unequal distortion in the cross-sectional direction, which may influence propagation of light, resulting from disturbance.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, of which.

DETAILED DESCRIPTION OF THE PREFERRED EMBODIMENT

Hereinafter, a detailed description is given of embodiment modes of a dispersion-shifted optical fiber according to the invention with reference to FIG. 1 through FIG. 4.

Figure 1:
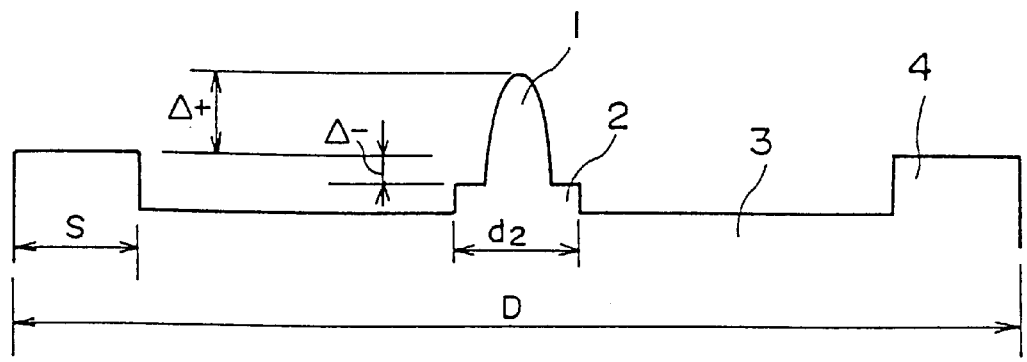
FIG. 1 is an explanatory view showing an embodiment of refractive index distribution of an optical fiber according to the invention.

FIG. 1 shows a refractive index profile of a preferred embodiment of a dispersion shifted optical fiber according to the invention, wherein 1 is the first core in which the amount of Ge doping is adjusted so that the refractive index has a distribution of the second power to the fourth power, 2 is the second core having F doped on pure $SiO_2$ glass, 3 is the first clad on which a greater amount of F is doped than the second core, and 4 is the second clad composed of pure $SiO_2$ glass.

In the embodiment, the first core 1 is $SiO_2$ on which Ge of the amount corresponding to +0.4 to 0.1% at the value of relative refractive index difference with respect to pure $SiO_2$ (hereinafter merely called "relative refractive index difference") is doped. The second core 2 is $SiO_2$ on which F of such an amount is doped, where the relative refractive index difference $\Delta^-$ corresponds to 0.1% or more and 0.5% or less. The first clad 3 is SiO2 on which a still greater amount of F is doped than the second core. The second clad 4 composed of pure $SiO_2$ glass has a thickness S which is 1 $\mu$m or more or 40 $\mu$m or less, wherein the diameter $d_2$ of the second core 2 is about 10 $\mu$m, and the outer diameter D of the second clad 4 is 125 $\mu$m.

Figure 2:
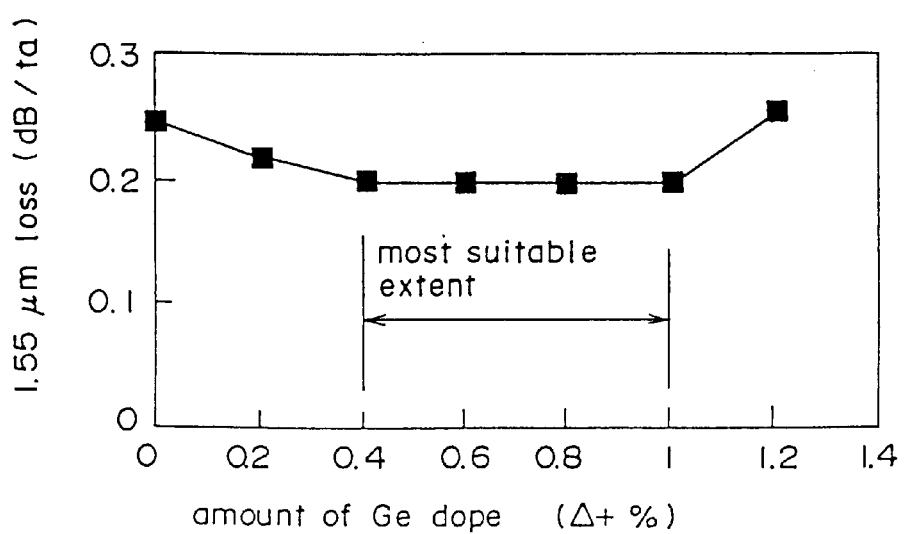
FIG. 2 is an explanatory view showing the relationship between the amount of Ge doped on the first core of an optical fiber shown in FIG. 1 and transmission loss thereof.

FIG. 2 is an explanatory view showing the relationship between the amount of Ge doped on the first core of an optical fiber according to the dispersion shifted preferred embodiment and transmission loss thereof.

Furthermore in FIG. 2, the amount of Ge doped on the first core 1 is expressed at a value of relative refractive index difference $\Delta^+$.

In a case where the amount of Ge doped on the first core 1 is less than 0.4%, the viscosity of the first core 1 becomes high when fiber drawing is carried out, wherein optical absorption is produced due to a distortion resulting from tension applied on the first core 1 when carrying out fiber drawing, thereby causing the transmission loss to be increased.

Furthermore, in a case where the amount of Ge doped on the first core 1 exceeds 1.0%, the imbalance of $GeO_2$ concentration in the first core 1 becomes large to cause optical scattering to be increased, thereby causing the transmission loss to be increased.

On the basis of the above description, it is most suitable that the amount of Ge doped on the first core 1 is in a range from 0.4% to 1.0% with respect to the relative refractive index difference $\Delta^+$.

Figure 3:
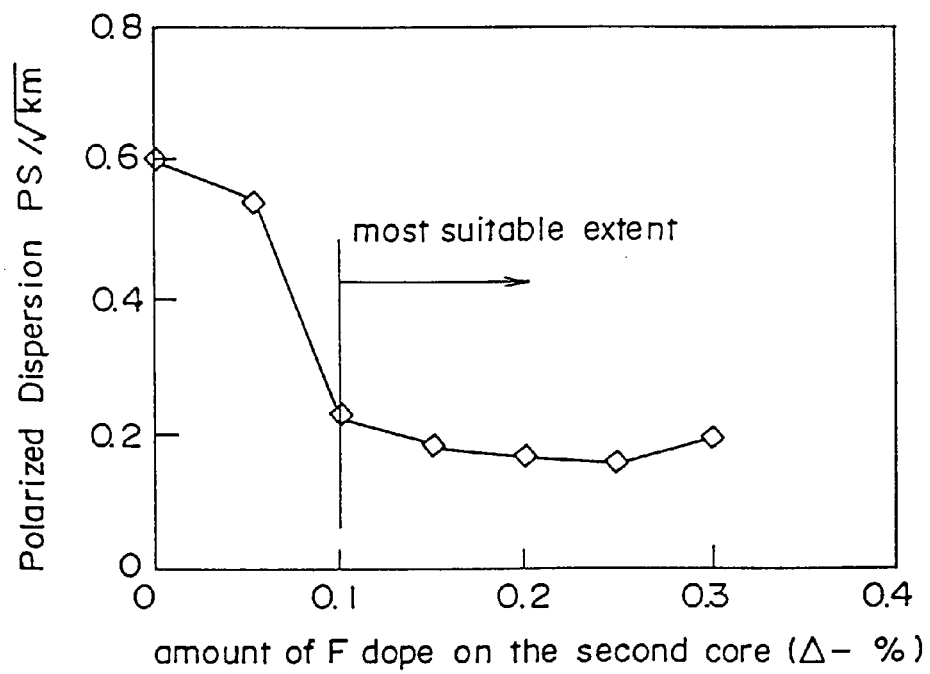
FIG. 3 is an explanatory view showing the relationship between the amount of F doped on the second core of an optical fiber shown in FIG. 1 and PMD thereof.

FIG. 3 is an explanatory view showing the amount of F doped on the second core 2 of an optical fiber according to the preferred embodiment and PMD thereof.

In a case where the amount of F doped becomes less than 0.1% at the value of relative refractive index difference, the difference in hardness between the second core 2 and the second clad 4 becomes small when carrying out fiber drawing, the second clad 4 does not function as a protection layer. That is, in a case where the difference in hardness between the second core 2 and the second clad 4 is large, the second clad 4 which has a greater hardness sustains a majority of tension when carrying out fiber drawing. However, if the difference in hardness becomes small, comparatively large tension is added to the second core 2 to cause the remaining distortion to be produced at the second core 2, wherein PMD is unavoidably increased.

On the basis of the abovementioned description, it is most suitable that the amount of F doped on the second core 2 is 0.1% or more at the value of the relative refractive index difference $\Delta^-$. Furthermore, on the basis of the result of consideration that the refractive index $n_2$ of the second core 2 is greater than the refractive index $n_3$ of the first clad 3, the amount of F doped on the second core 2 is 0.5% or less at the value of relative refractive index difference $\Delta^-$.

Figure 4:
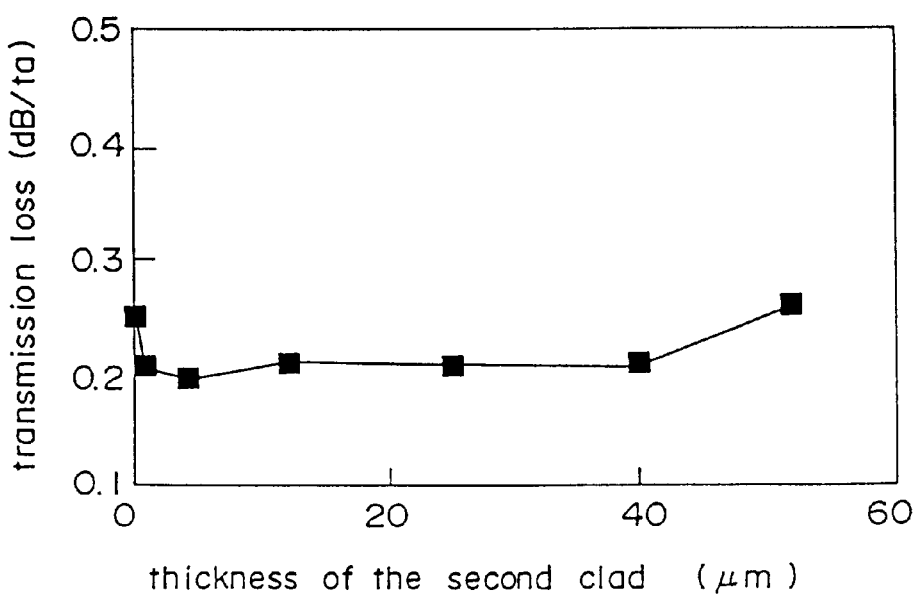
FIG. 4 is an explanatory view showing the relationship between the thickness of the second clad of an optical fiber shown in FIG. 1 and transmission loss thereof.
Figure 5:
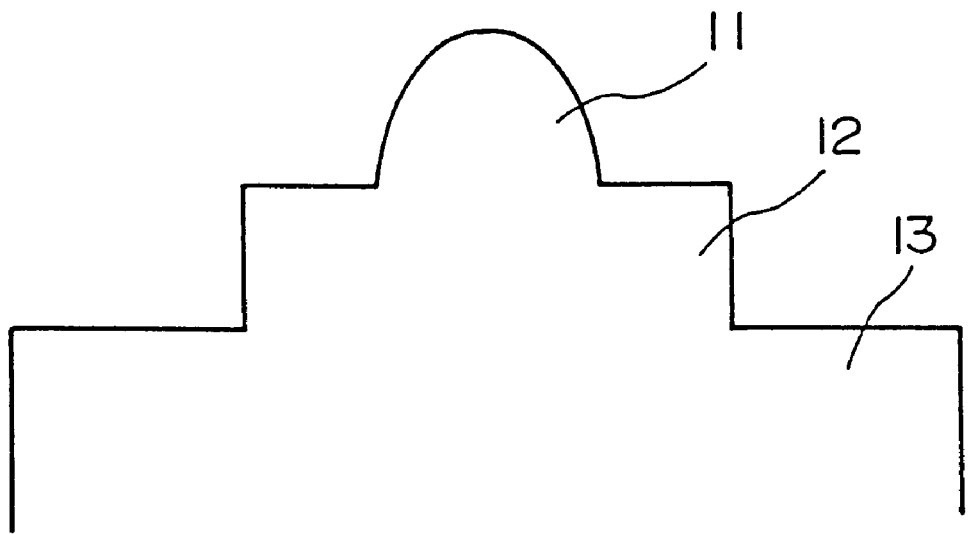
FIG. 5 is an explanatory view showing one example of refractive index distribution of a conventional optical fiber.

FIG. 4 is an explanatory view showing the relationship between the thickness S of the second clad 4 of an optical fiber according to the preferred embodiment and PMD thereof.

On the basis of FIG. 4, it is practical and most suitable that the thickness of the second clad 4 is in a range from 1 $\mu$m or more to 40 $\mu$m or less.

Of course, numerous other embodiments may be envisaged, without departing from the spirit and scope of the invention.

What is claimed is:

1. A dispersion shifted optical fiber comprising a first core (refractive index $n_1$), a second core (refractive index $n_2$), a first clad (refractive index $n_3$) and a second clad (refractive index $n_4$) in the order from the center to outside, wherein said refractive indexes are in a relative relationship of $n_1>n_4>n_2>n_3$, the first core being doped with Ge which is at a ratio of substantially about 0.4 to 1.0% to provide the relative refractive index difference between the second clad and said first core, the second core being doped with F which is at a ratio of substantially about 0.1 to 0.5% to provide the relative refractive index difference between the second clad and the second core, said second cladding being $SiO_2$, which has a thickness from substantially about 1 $\mu$m or more to 40 $\mu$m, and F is doped on only the second core of the first core and the second core.

2. A dispersion shifted optical fiber as defined in claim 1, wherein the first core is only doped with Ge.

* * * * *